United States Patent
Patel et al.

(10) Patent No.: US 11,079,951 B2
(45) Date of Patent: Aug. 3, 2021

(54) MULTI-TIER STORAGE AND MIRRORED VOLUMES

(71) Applicant: International Business Machines Corporation, Armonk, NY (US)

(72) Inventors: Kushal Patel, Pune (IN); Mohit Chitlange, Pune (IN); Sarvesh S. Patel, Pune (IN); Ajinkya Nanavati, Pune (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 16/571,367

(22) Filed: Sep. 16, 2019

(65) Prior Publication Data

US 2021/0081125 A1 Mar. 18, 2021

(51) Int. Cl.
*G06F 12/00* (2006.01)
*G06F 13/00* (2006.01)
*G06F 3/06* (2006.01)

(52) U.S. Cl.
CPC ............ *G06F 3/0635* (2013.01); *G06F 3/065* (2013.01); *G06F 3/067* (2013.01); *G06F 3/0607* (2013.01); *G06F 3/0611* (2013.01); *G06F 3/0685* (2013.01)

(58) Field of Classification Search
CPC .... G06F 3/0635; G06F 3/0607; G06F 3/0611; G06F 3/065; G06F 3/067; G06F 3/0685
USPC ....................................................... 711/154
See application file for complete search history.

(56) References Cited

U.S. PATENT DOCUMENTS

| | | | | |
|---|---|---|---|---|
| 5,537,585 A | * | 7/1996 | Blickenstaff | .......... G06F 3/0617 |
| 5,920,867 A | * | 7/1999 | Van Huben | ......... G06F 16/2343 |
| 6,035,297 A | * | 3/2000 | Van Huben | ............. G06F 16/25 |
| | | | | 707/695 |
| 8,555,018 B1 | * | 10/2013 | Rohr | ..................... G06F 3/0649 |
| | | | | 711/165 |
| 8,838,931 B1 | * | 9/2014 | Marshak | ............... G06F 3/0649 |
| | | | | 711/170 |
| 8,843,459 B1 | * | 9/2014 | Aston | ..................... G06F 16/13 |
| | | | | 707/694 |

(Continued)

OTHER PUBLICATIONS

IBM, "IBM Research | Almaden", printed May 28, 2019, 11 pages http://www.almaden.ibm.com/storagesystems/projects/easytier/.

(Continued)

*Primary Examiner* — Sheng Jen Tsai
(74) *Attorney, Agent, or Firm* — Donald J. O'Brien

(57) ABSTRACT

Embodiments are disclosed for a multi-tier storage system (MTSS). The techniques include identifying a first data extent stored in a first storage pool of MTSS based on a read-write heat mapping by the MTSS. The first data extent is associated with a mirrored volume. The first data extent is a mirrored copy of a second data extent stored in a second storage pool of the MTSS. The first storage pool is asymmetric to the second storage pool. The techniques also include determining that a second top promotion tier of the second storage pool is faster than a first top promotion tier of the first storage pool. The techniques further include promoting the second data extent to the second top promotion tier based on the determination. Additionally, the techniques include updating an I/O access policy to direct future I/O operations for the mirrored volume to the second data extent.

20 Claims, 9 Drawing Sheets

(56) References Cited

U.S. PATENT DOCUMENTS

| | | | | |
|---|---|---|---|---|
| 8,850,011 | B2* | 9/2014 | Kimchi | G08G 1/0969 |
| | | | | 709/226 |
| 8,868,797 | B1* | 10/2014 | Kirac | G06F 3/0631 |
| | | | | 710/15 |
| 8,935,493 | B1* | 1/2015 | Dolan | G06F 3/0649 |
| | | | | 711/161 |
| 9,229,854 | B1* | 1/2016 | Kuzmin | G06F 11/1072 |
| 9,275,063 | B1* | 3/2016 | Natanzon | G06F 3/065 |
| 9,323,682 | B1* | 4/2016 | Marshak | G06F 12/121 |
| 9,513,814 | B1* | 12/2016 | Can | G06F 3/0649 |
| 9,524,218 | B1* | 12/2016 | Veprinsky | G06F 11/1474 |
| 9,760,306 | B1* | 9/2017 | Bigman | G06F 3/0605 |
| 9,798,472 | B1 | 10/2017 | Natanzon et al. | |
| 9,927,991 | B2 | 3/2018 | Jain et al. | |
| 9,959,054 | B1* | 5/2018 | Vankamamidi | G06F 11/34 |
| 10,353,634 | B1* | 7/2019 | Greenwood | G06F 3/0619 |
| 10,445,229 | B1* | 10/2019 | Kuzmin | G06F 3/0659 |
| 10,552,085 | B1* | 2/2020 | Chen | G06F 3/0647 |
| 10,740,016 | B2* | 8/2020 | White | G06F 3/0647 |
| 2008/0276016 | A1* | 11/2008 | Fujibayashi | G06F 3/068 |
| | | | | 710/36 |
| 2009/0135700 | A1* | 5/2009 | Fujibayashi | G11B 15/689 |
| | | | | 369/85 |
| 2014/0215129 | A1* | 7/2014 | Kuzmin | G06F 12/0246 |
| | | | | 711/103 |
| 2015/0106578 | A1* | 4/2015 | Warfield | G06F 3/0631 |
| | | | | 711/158 |
| 2015/0378856 | A1* | 12/2015 | Yamakawa | G06F 3/0683 |
| | | | | 714/6.3 |
| 2016/0034481 | A1* | 2/2016 | Kumarasamy | G06F 16/128 |
| | | | | 707/639 |
| 2016/0054922 | A1* | 2/2016 | Awasthi | G06F 3/061 |
| | | | | 711/103 |
| 2016/0210050 | A1* | 7/2016 | Hyun | G06F 3/0659 |
| 2016/0291890 | A1 | 10/2016 | Jennas, II et al. | |
| 2017/0004154 | A1* | 1/2017 | Blumenau | G06F 16/219 |
| 2017/0004314 | A1* | 1/2017 | Blumenau | G06F 21/6218 |
| 2017/0336994 | A1* | 11/2017 | Jain | G06F 3/0685 |
| 2018/0101477 | A1* | 4/2018 | Kan | G06F 12/0246 |
| 2018/0136838 | A1* | 5/2018 | White | G06F 3/0647 |
| 2018/0173453 | A1 | 6/2018 | Danilov et al. | |
| 2018/0356992 | A1* | 12/2018 | Lamberts | G06F 3/0685 |
| 2019/0050148 | A1* | 2/2019 | Jain | G06F 3/0619 |
| 2019/0188100 | A1* | 6/2019 | Patel | G06F 3/065 |
| 2020/0126606 | A1* | 4/2020 | Lee | G11C 11/1675 |
| 2020/0293219 | A1* | 9/2020 | Szczepanik | G06F 3/0683 |
| 2021/0064272 | A1* | 3/2021 | Patel | G06F 3/0655 |

OTHER PUBLICATIONS

Sandisk, "Software is Required to Optimize the Flash Transformed Data Center", Flash Memory Summit, Aug. 5-7, 2014, 1 page, https://docplayer.net/docs-images/42/1093506/images/page_19.jpg.

* cited by examiner

MULTI-TIER STORAGE AND MIRRORED VOLUMES

BACKGROUND

The present disclosure relates to multi-tier storage, and more specifically, to a multi-tier storage system and mirrored volumes.

Storage systems are systems used by computers to perform the reading and writing of data. Data may be read from, and written to, different types of storage devices, e.g., hard disk drives, solid-state drives, flash memory, and the like. Each type of storage device offers different advantages and challenges in terms of access, latency, and other criteria. A multi-tier storage system (MTSS) can include multiple types of storage devices grouped into tiers based on the speed of access. For the purpose of efficiency, an MTSS can store relatively frequently accessed data on a tier with relatively faster access storage devices. Further, the MTSS can store relatively less frequently accessed data on a tier with relatively slower access storage devices.

SUMMARY

Embodiments are disclosed for a multi-tier storage system (MTSS). The techniques include identifying a first data extent stored in a first storage pool of MTSS based on a read-write heat mapping by the MTSS. The first data extent is associated with a mirrored volume. The first data extent is a mirrored copy of a second data extent stored in a second storage pool of the MTSS. The first storage pool is asymmetric to the second storage pool. The techniques also include determining that a second top promotion tier of the second storage pool is faster than a first top promotion tier of the first storage pool. The techniques further include promoting the second data extent to the second top promotion tier based on the determination. Additionally, the techniques include updating an I/O access policy to direct future I/O operations for the mirrored volume to the second data extent.

Embodiments also identify a first data extent stored in a first storage pool of a multi-tier storage system (MTSS) based on a read-write heat mapping by the MTSS. The first data extent is a mirrored copy of a second data extent stored in a second storage pool of the MTSS. Further, the first data extent is read-intensive. The second top promotion tier comprises read-intensive storage. Additionally, identifying the first data extent comprises determining that a number of READ operations performed on the read-intensive data extent exceeds a predetermined threshold the first data extent is associated with a mirrored volume. Further, determining that a second top promotion tier of the second storage pool is faster than a first top promotion tier of the first storage pool. Also, promoting the second data extent to the second top promotion tier is based on the determination.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
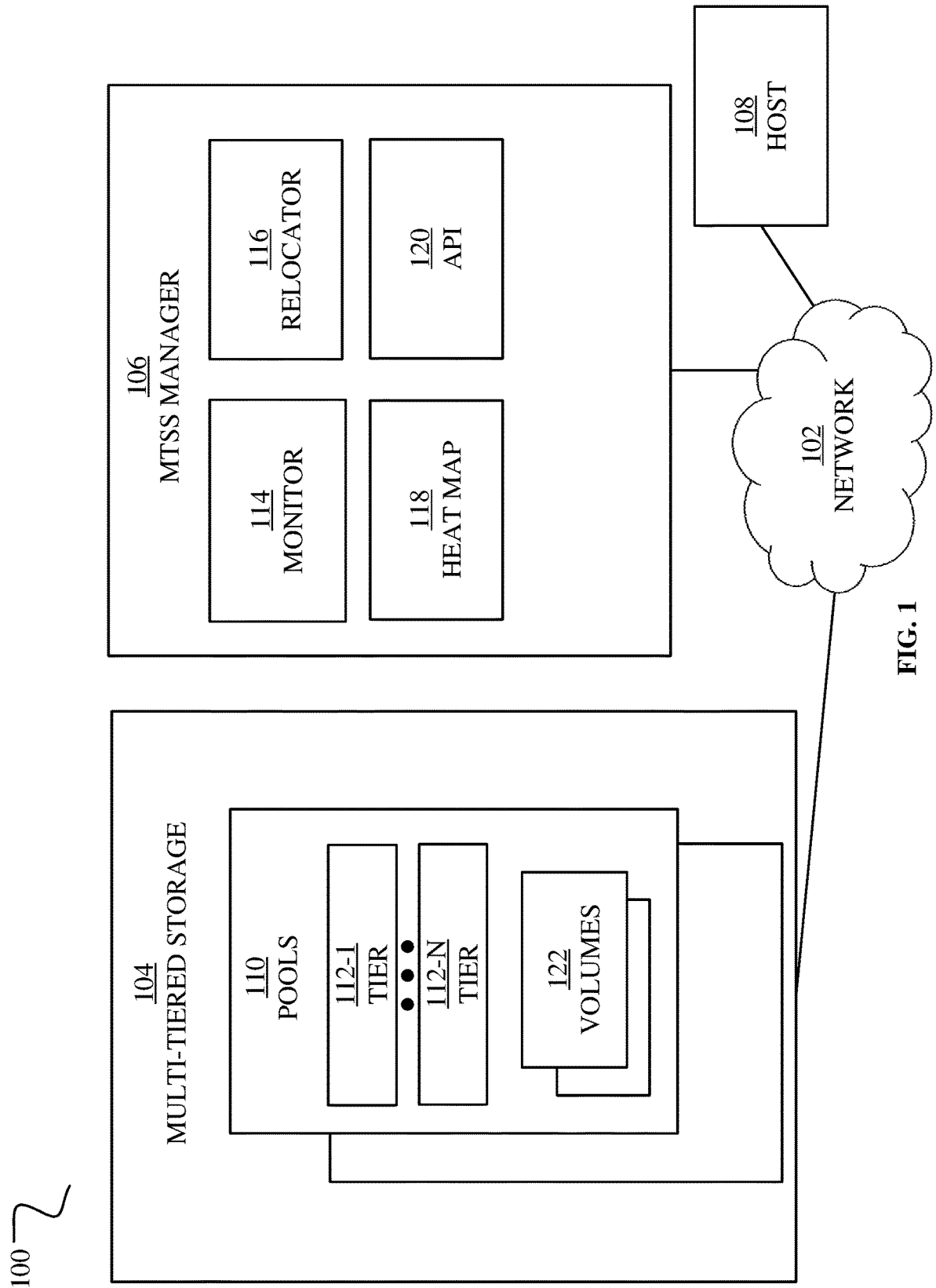
FIG. 1 is a block diagram of a multi-tier storage system (MTSS), in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Some storage control systems provide the mechanism of multi-tiered storage where the data is stored across multiple types of storage mediums based on criteria, such as, access, frequency of use, security and data recovery requirements. In terms of security, sensitive data might be stored on relatively high-speed solid state drives (SSD), along with frequently accessed data. In contrast, infrequently accessed data (for which a higher response time can be more tolerable) might be stored in a slower performing tier on high-capacity drives. The cost per gigabyte of storage is relatively higher for faster-performing storage devices, such as SSDs, and relatively lower for the slower performing drives.

More specifically, a multi-tier storage system (MTSS) calculates a heat value for data that takes into consideration the above-stated criteria, for example. The MTSS can thus use predetermined threshold heat values to determine in which tier to store, any particular portion of data. Data portions are referred to herein as extents and grains of extents. Using heat values in this way, the MTSS can store relatively highly accessed data to faster performing tiers when a predetermined threshold is reached for the associated tier. In contrast, the MTSS can move the data extents with lower heat values, i.e., relatively fewer accesses (e.g., where an access includes a read or a write operation), to a slower performing tier when the predetermined threshold is reached for the associated tier.

In an MTSS, there can be at least two tiers available, wherein the first tier can provide relatively fast response times (and relatively less storage capacity) and the other tiers can provide relatively slow response times (and relatively more storage capacity). While the storage devices having faster response times can be more expensive than storage devices having slower response times, the capacity of relatively faster storage devices can be less than that of relatively slower storage devices. Accordingly, an MTSS moves data with relatively high heat values (hot data) to the faster tiers, and data with relatively low heat values (cold data) to slower tiers. This process of moving data to a faster tier is referred to herein as promotion. Conversely, the process of moving data to a slower tier is referred to herein as demotion. The MTSS can perform the extent promotion and demotion processes using a copy operation that is performed without the knowledge of the application that is using the data. In this way, user transparency is maintained. User transparency refers to the location and management of the data being transparent (not viewable) to the application that is using the data (user). In this way, the data movement is also not visible to the user. Since solid state drives (SSDs) are faster than hard disk drives (HDDs), an MTSS can provide dynamic relocation of data of across tiers based on the data usage by placing hot data, i.e., data with high TO density and low response time requirements, on SSDs. Conversely, an MTSS can use HDDs for cold, or cooler, data that is accessed at lower rates and/or sequentially.

In addition to storing data within tiers, an MTSS can organize the tiers within pools. Hence, data can be promoted and demoted across tiers within a pool of data. Additionally, an MTSS can include features, such as mirroring, wherein a volume of data has two copies. With mirroring, each copy of the volume is stored in a separate pool for redundancy, and to improve the availability of the mirrored data. Additionally, mirroring can provide backend level data redundancy. Accordingly, when computer applications attempt to read data in a mirrored volume, the read can be performed on either volume. In some scenarios, predetermined access policies can be used to determine how read and write operations are performed. Additionally, such policies can indicate when write IOs are replicated to both the copies to keep them synchronized.

For example, access policies can include preferred path policies and round-robin policies. A preferred path policy can indicate that a specific one of the copies is used for read and write operations. The preferred path can refer to the path of a physical file location of this copy. A round-robin policy can indicate that each read operation alternates between the mirrored volumes. Example storage pools A and B can each include a copy of a mirrored volume of data. In an example implementation, storage pool B can be specified in a preferred path policy. Accordingly, read operations are performed on the volume in storage pool B. However, in a round-robin policy, the read operations can alternate between storage pools A and B. Thus, a first read operation can be performed on storage pool A, a second read operation on storage pool B, and repeating in a round-robin pattern for subsequent reads from the mirrored volumes.

However, in a round-robin I/O access policy for mirrored volumes, the heat map for each of the copies can reflect half of the actual READ operations. Because of this, there are multiple limitations that are observed. For example, when considered separately, the heat values of mirrored data can fall below promotion thresholds. However, if considered in sum, the heat values of mirrored data can exceed such promotion thresholds. Thus, considering promotion based on the separate heat values for mirrored data can disadvantage otherwise qualifying data from promotion.

Further, some storage pools may include read-intensive storage devices, e.g., drives. Read-intensive storage is a different type of storage than traditional, enterprise-class SSDs, which are built on mid to high-endurance, multi-level cell, flash memory. In contrast, read-intensive drives have lower endurance than SSDs, but can provide higher performance than SSDs at relatively low cost. Additionally, read-intensive drives can provide lower levels of overprovisioning than SSDs, which can be useful in storage pools that are performing relatively high occurrences of read operations, and relatively low occurrences of write operations. Over-provisioning refers to scenarios where a storage device begins to suffer in performance because of an imbalance between available space on the storage device and requests for space from the computing system. Reducing over-provisioning by using read-intensive drives can thus help reduce the overall cost of storage.

However, the usefulness of read-intensive drives can be limited in the case of mirrored volumes. In some scenarios, an MTSS can restrict promotion of data to the tiers within a single pool. Thus, if only one copy of a mirrored volume is within a tier that has read-intensive storage, and this copy is not named in a preferred path policy, this copy may not generate a high enough heat value to qualify for promotion as a read-intensive extent. Read-intensive extents can be promoted to the higher performance read-intensive storage tier. Rather, the copy in the pool without read-intensive drives may instead be promoted to valuable SSD storage tier space. Thus, instead of taking advantage of a READ heavy workload by promoting the data to a read-intensive storage tier, the copy in the pool without a read-intensive storage tier can occupy storage that could be more efficiently used for data with mixed READ and WRITE workloads.

Accordingly, embodiments of the present disclosure can promote the data in mirrored volumes to increase the use of cost-saving, read-intensive storage. In case of asymmetric storage pools, containing differently tiered storage, embodiments can handle mirrored extents in both volume copies. Embodiments can include a storage virtualization layer that identifies mirrored volumes, and the respective tiers in the associated storage pools. Embodiments can use this identification to determine a useful extent placement that can take advantage of read-intensive storage when available to one of the copies.

Referring now to FIG. 1, which is a block diagram of a multi-tier storage system (MTSS) 100, in accordance with some embodiments of the present disclosure. The MTSS 100 includes a network 102, multi-tiered storage 104, MTSS manager 106, and a host 108. The network 102 can be one or more computer communication networks, including wired and/or wireless local area networks and/or wide-area networks (WANs). WANs can include the Internet, for example. The multi-tiered storage 104, MTSS manager 106, and host 108 can be in communication over the network 102.

The multi-tiered storage 104 can include the actual data storage devices of the MTSS 100, such as SSDs, HDDs, flash storage, and the like. The multi-tiered storage 104 can be a block level storage system and can organize the data storage devices into storage pools 110. Organizing storage devices into storage pools 110 can be useful for efficiency reasons when running relatively large numbers of computer applications. A storage pool 110 of storage devices can include multiple types, from relatively faster to relatively slower storage devices. According to embodiments of the present disclosure, each of the storage pools 110 can be organized into multiple storage tiers 112-1 through 112-n. The storage tiers 112 are referred to herein individually, e.g., storage tier 112-1, and collectively, e.g., storage tiers 112. The storage tier 112-1 can represent the relatively fastest tier. Conversely, in a storage pool 110 with n storage tiers 112, the storage tier 112-n can represent the relatively slowest tier.

The multi-tiered storage 104 can also organize the data storage devices into volumes 122. Each of the volumes 122 can represent a collection of data that is related. Each volume 122 can include numerous data extents, which can be stored on numerous storage tiers 112. Thus, even though the data from a particular volume is all related, some of the data extents can be stored on storage tier 112-1, other data extents on storage tier 112-2 through 112-N.

According to embodiments of the present disclosure, one or more of the volumes 122 can be mirrored in storage pools A and B, for example. Further, the storage pools A and B can have asymmetric storage tiers 112. In other words, the storage tiers 112 of storage pools A and B may be different. For example, storage pool A can include SSD and HDD tiers. In contrast, storage pool B can include read-intensive flash, SSD, HDD and nonlinear (NL) tiers. However, if a preferred path policy indicates that the copy in storage pool A is used for I/O operations, the data from this volume can get hot and qualify for promotion to faster storage tiers. However, because there is no read-intensive flash in storage pool A, even if the data is accessed exclusively with READ operations, the data copy cannot be stored in read-intensive flash, from where the data can be more efficiently read.

Accordingly, in embodiments of the present disclosure, the MTSS manager 106 can identify read-intensive data extents, and storage pools 110 where read-intensive storage is available for a mirrored copy of the data. The MTSS manager 106 can also promote the mirrored copy to the read-intensive storage tier. Further, the MTSS manager 106 can change the preferred path of mirrored data to the storage pool 110 where the read-intensive storage is available. As such, in the above example, the MTSS manager 106 can promote the data extent in storage pool B to the read-intensive flash tier. Further, the MTSS manager 106 can change the preferred path of the mirrored data extent to the copy in storage pool B.

More specifically, the MTSS manager 106 can calculate separate heat values for each of the READ and WRITE operations of a data extent. In this way, the MTSS manager 106 can identify read intensive extents that can be more efficiently read from read-intensive storage. Once identified, the MTSS manager 106 can promote the data extent in storage pool B to the read-intensive flash tier. Additionally, the MTSS manager 106 can use an in-bound API signal to change the preferred path to new faster tier location (i.e., storage pool B). Additionally, the MTSS manager 106 can mark the extent in the storage pool 110 without the faster read-intensive flash tier (Pool-A extent) as cold, to prevent promotion. In this way, faster tier storage space can be left available for data extents with mixed operation workloads.

When the I/O access policy is round robin however, the MTSS manager 106 can sum the heat values for each of the mirrored copies when determining whether one of the extents qualifies for promotion. More specifically, the MTSS manager 106 can sum the READ operations to determine actual READ access to the data extent. In this way, the MTSS manager 106 can consider the actual heat count for READ operations on the data extent during the tiering cycle. Thus, if the cumulative heat value meets promotion threshold criteria, then the copy of the data extent that is selected for promotion can be based on the types of tiers available in each pool. For example, because storage pool B has a read-intensive flash tier, the data extent can be promoted in storage pool B. Further, the MTSS manager 106 can temporarily change the I/O access policy from round robin to a preferred path policy for the data extent copy in storage pool B. This internal policy change can result in all future READ operations being routed to the faster read-intensive flash tier. According to some embodiments of the present disclosure, the MTSS manager 106 can also resume the round robin I/O access policy when the data extents are demoted back to the original tier after multiple incidence cycles in the promoted tier. For example, in the next tiering cycle, the extents are demoted back to the HDD tier on both storage pools 110, then the MTSS manager 106 can update the I/O access policy back to round robin for performance benefits.

This approach also avoids the potential challenge of duplicated extents in the faster performing tier. For example, if an extent A is accessed from mirrored disk frequently, then, for a round robin access policy, both volume copies can experience more I/O access. Hence, both copies can be moved to a faster performing tier during the tiering cycle. Accordingly, the same copy of extent A can be stored in both pools and in faster performing tiers (the costlier space) which does not give the potential advantage to the application. According to one embodiment of the present disclosure, the MTSS manager 106 can promote both copies of the mirrored data extents to faster storage tiers 112. For example, the MTSS manager 106 can promote both copies when the READ and WRITE access is greater than a predetermined high threshold for handling of single extent copy based on the performance need.

The monitor 114 can monitor I/O operations to extents across the storage pools 110 in the multi-tiered storage 104 to generate a heat map for each of the data extents. In this way, the MTSS manager 106 can identify candidate extents for promotion. The MTSS manager 106 includes a monitor 114, a relocator 116, a heat map 118, and an application programming interface (API) 120.

The monitor 114 can monitor the I/O operations performed for each data extent in the storage pools 110. The monitor 114 can be a heat monitoring daemon that updates the extent heat for each I/O operation executed on the storage pool 110. This heat information is further used to determine the extent promotion and demotion across the storage tiers 112 of the storage pool 110.

The relocator 116 can identify data extents that are relatively frequently accessed (hot) based on the access heat temperature (access counters which are updated on each I/O operation). Accordingly, the relocator 116 promotes the hot data extents to SSDs for high throughput, low latency, and/or I/O operations per second (IOPS) energy-efficient characteristics.

More specifically, the monitor 114 can generate the heat map 118 of the extents stored in the multi-tiered storage 104 across the storage pools 110. Further, the relocator 116 can periodically evaluate the heat map 118 of each storage pool 110 and identify candidate extents for promotion and demotion. Accordingly, the relocator 116 can move candidate extents across storage tiers 112 when the candidate extents meet their promotion or demotion thresholds. These periodic evaluation and promotion/demotion techniques are referred to herein as tiering cycles.

The host 108 can be a computer application that is using the multi-tiered storage 104 for the computer application's data. The API 120 can provide access for the host 108 to the data extents in the storage pools 110 of the multi-tiered storage system 104. In other words, when the host 108 performs a READ or WRITE access on a data extent, the host 108 can invoke the API 120 to identify the location of the data extent. In this way, the host 108 can READ from, or WRITE to, data extents without knowing on what storage pool 110 or storage tier 112 the data extent is stored.

The API 120 is a communication interface that communicates with a virtualization layer of the MTSS system 100. The API 120 includes a set of functions that can be used by the components of the MTSS system 100 to communicate and exchange information across processes. Thus, the virtualization layer can be an interface between the host 108 and the MTSS 104. Accordingly, when the host 108 requests a READ or WRITE operation in the MTSS 104, the host 108 sends this request through the virtualization layer, which invokes the API 120. Accordingly, whenever the host 108 requests a READ operation on a mirrored volume, the virtualization layer can check for the mirror copy, checks for the I/O access policy, and determine if one of the copies is stored in a storage pool 110 with read-intensive storage. Additionally, the virtualization layer can issue further READ operations to the copy where the extents are stored in read-intensive flash. In this way, the MTSS manager 106 can provide more efficient use of costlier SSD space. Thus, even if the storage pools do not contain read-intensive flash, embodiments can provide efficient extent placement, and achieve inter-pool and inter-volume performance equilibrium with enhanced extent placement.

In some embodiments, the API 120 can include in-bound and out-of-bound APIs that possess the capability to connect with the components of the system 100. Additionally, the API 120 can also provide the capability to collect data extents and instruct the relocator 116 for extent movement based on the implementation. The API 120 can also identify access policies, and dynamically trigger policy changes based on the extent movement decisions as described above.

According to embodiments of the present disclosure, the monitor 114 can maintain different heat maps 118 for each of the READ and WRITE operations on the extents for the volumes 122 with mirrored copies. In some embodiments, the monitor 114 can determine that the volume type is mirrored, and thus generate and maintain the separate heat maps 118 for the data extents within.

Further, according to some embodiments of the present disclosure, the relocator 116 can use the API 120 to determine the I/O access policy. The API 120 can include in-bound or out-of-bound API implementations. Additionally, the relocator 116 can store I/O access policy information using the API 120. Accordingly, the virtualization layer can send proactive updates to the MTSS manager 106 using API signals when a policy change is detected.

Additionally, the virtualization layer can include a dynamic VO-based switch wherein the destination of the I/O operation is dynamically selected based on the type of I/O (READ/WRITE). For example, for READ operations on mirrored volume extents, a storage virtualization controller can perform the READ in the storage pool 110 with the read-intensive flash tier. Further, the WRITE operations can be performed in the storage pool with the slower storage tier 112.

According to embodiments of the present disclosure, the MTSS manager 106 can use a last I/O access policy for heat map merging. The last I/O access policy can indicate the I/O access performed on the extent during the previous tiering cycle. Further, the MTSS manager 106 can collect the information about I/O access counters during tiering cycles to perform these determinations.

According to embodiments of the present disclosure, the MTSS manager 106 can determine whether to merge the heat values for mirrored data extents based on whether the merged heat values meet the promotion threshold for a read-intensive flash tier. In this way, the MTSS manager 106 can achieve some performance benefits by reducing the merge processing.

Figure 2A:
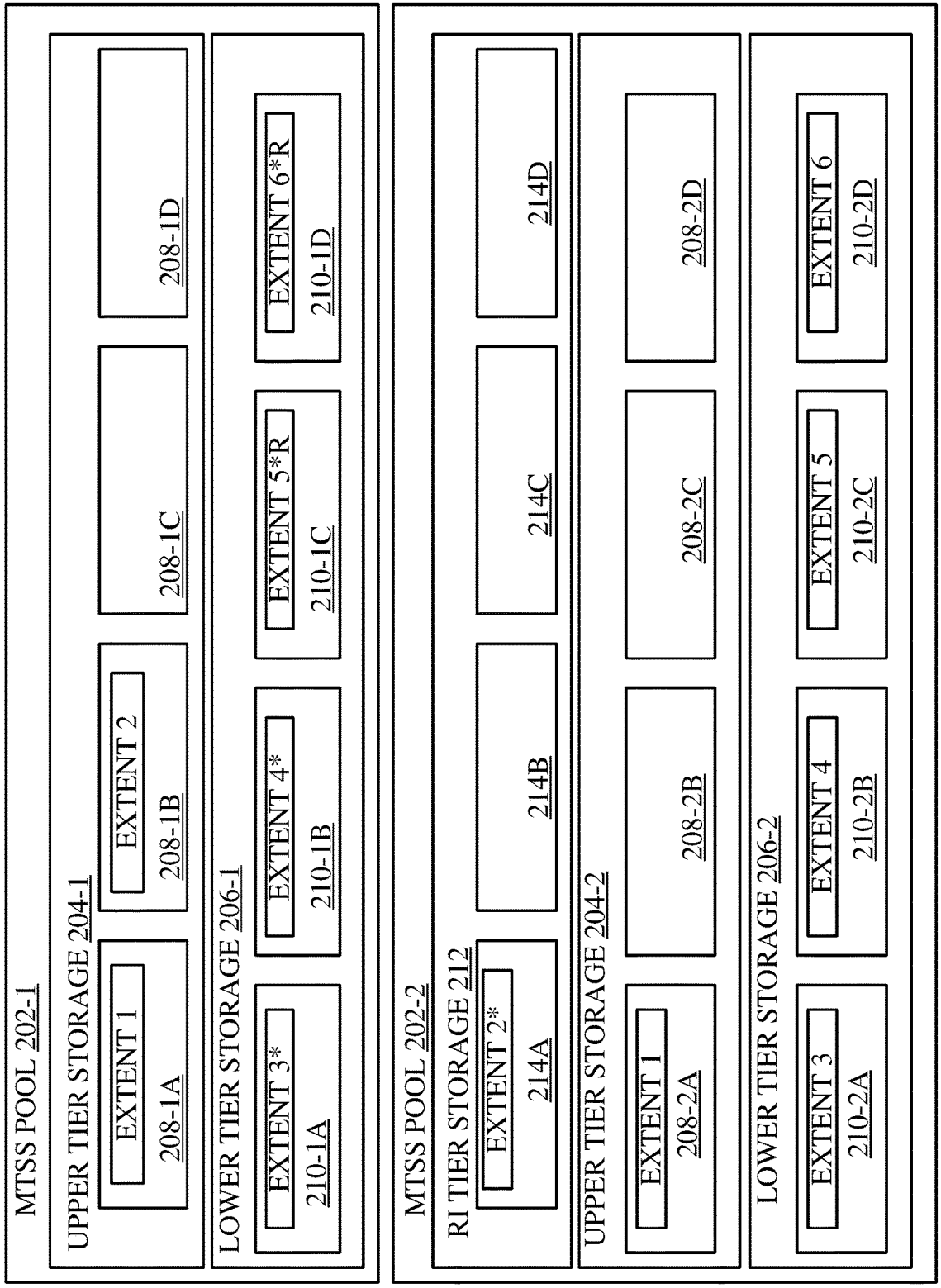
FIG. 2A is a block diagram of MTSS pools of a multi-tier storage before completion of a tiering cycle with a preferred path I/O access policy, in accordance with some embodiments of the present disclosure.

Referring now to FIG. 2A, which is a block diagram of MTSS pools 202-1, 202-2 of a multi-tier storage before completion of a tiering cycle with a preferred path I/O access policy, in accordance with some embodiments of the present disclosure. The MTSS pool 202-1 includes an upper tier storage 204-1 and a lower tier storage 206-1. The upper tier storage 204-1 can represent the tier with relatively faster access than the lower tier storage 206-1. The upper tier storage 204-1 includes four slots 208-1A through 208-1D to store promoted extents. For example, slots 208-1A, 208-1B store EXTENT 1 and EXTENT 2, respectively. Similarly, the lower tier storage 206-1 includes four slots 210-1A through 210-1D to store extents. For example, slots 210-1A through 210-1D store EXTENT 3 through EXTENT 6, respectively.

As stated previously, between tiering cycles, the MTSS manager 106 can count the number of I/O operations performed on the data extents stored in the storage pools 110. Accordingly, during the tiering cycle, the MTSS manager 106 can determine which data extents are eligible for promotion and demotion. As shown, EXTENTS 3 through 6 are annotated with an asterisk, "*." In this example, the EXTENTS 3 through 6 in MTSS pool 202-1 can represent the preferred path copies for the mirrored volumes 122 storing these data extents. Accordingly, the asterisk indicates that these extents have met the heat map threshold for promotion to the upper tier storage 204-1.

Further, for mirrored volumes 122, the MTSS manager 106 can count the number of READ operations and the number of WRITE operations performed on data extents, such as, EXTENT 1 through EXTENT 6. As such, the MTSS manager 106 can determine whether the data extents in the mirrored volumes 122 are read-intensive. The determination can be based on a threshold number of READ operations, at and over which, the data extent can be classified as read-intensive. Additionally, the determination can be based on a threshold percentage of READ operations versus WRITE operations, at and over which, the data extent can be classified as read-intensive. As shown, EXTENT 5 and EXTENT 6 also include the annotation, "R," which indicates that these are read-intensive extents.

In this example, EXTENTS 1 through 6 represent extents from mirrored volumes. Accordingly, copies of the EXTENTS 1 through 6 can be stored in the MTSS pool 202-2. Similar to the MTSS pool 202-1, the MTSS pool 202-2 includes an upper tier storage 204-2 and a lower tier storage 206-2. Additionally, the MTSS pool 202-2 includes a read-intensive (RI) tier storage 212. The RI tier storage 212 includes four slots 214A through 214D to store promoted extents. In this example, the slot 214A includes EXTENT 2, which is annotated with an asterisk. The asterisk indicates that EXTENT 2 has met the heat map threshold for demotion to the upper tier storage 204-2.

The upper tier storage 204-2 includes four slots 208-2A through 208-2D to store promoted extents. For example, slot 208-2A stores EXTENT 1. Similarly, the lower tier storage 206-2 includes four slots 210-2A through 210-2D to store extents. For example, slots 210-2A through 210-2D store EXTENT 3 through EXTENT 6, respectively. In contrast to the lower tier storage 206-1, none of the extents in slots 210-2A through 210-2D are eligible for promotion.

According to embodiments of the present disclosure, the MTSS manager 106 can determine that read-intensive extents EXTENT 5 and EXTENT 6 are from mirrored volumes 122, and thus have copies in MTSS pool 202-2. Additionally, the MTSS manager 106 can determine that, in contrast to MTSS pool 202-1, MTSS pool 202-2 has RI tier storage 212. Accordingly, the MTSS manager 106 can promote EXTENT 5 and EXTENT 6 to the RI tier storage 212.

Figure 2B:
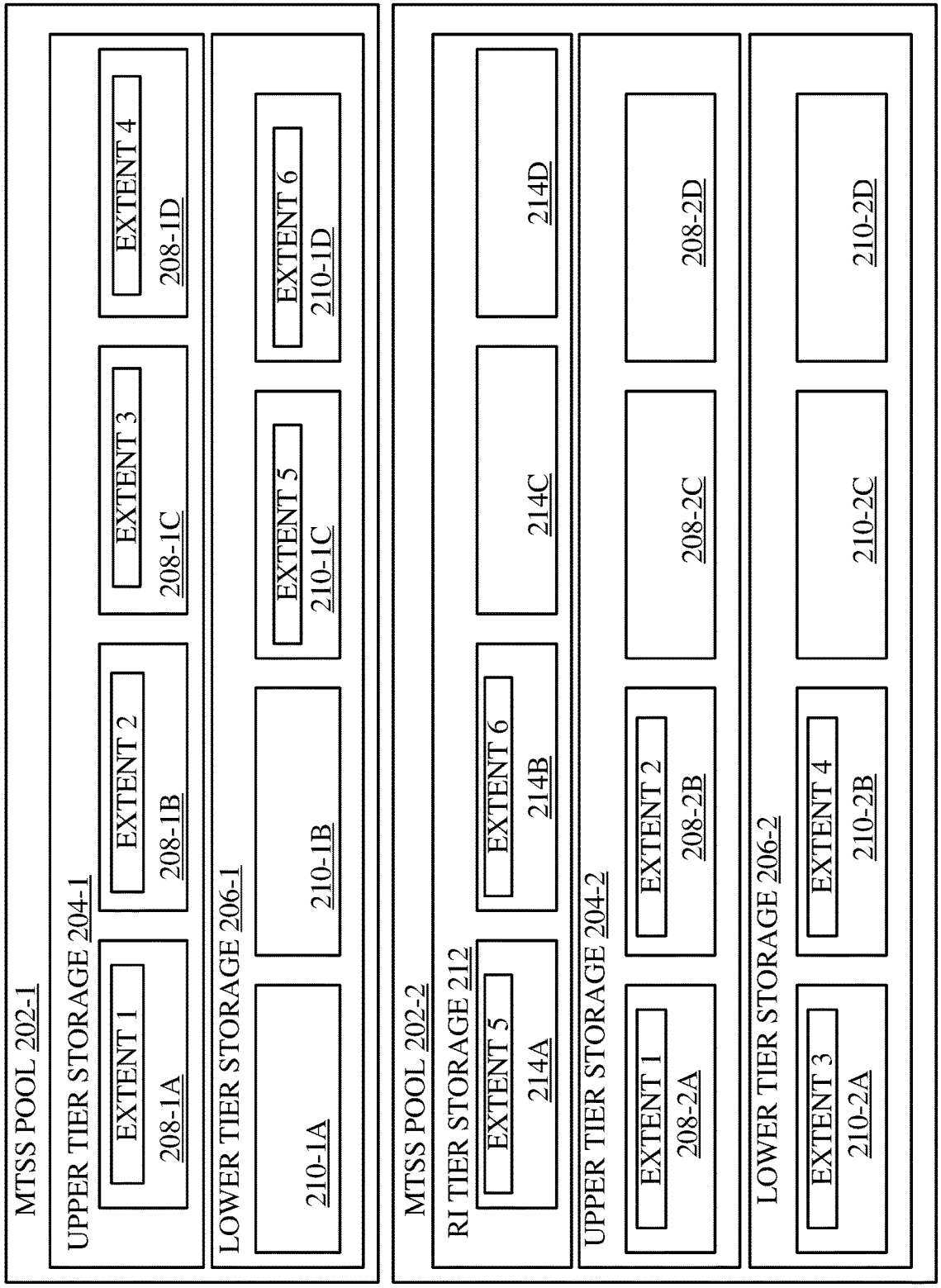
FIG. 2B is a block diagram of MTSS pools of a multi-tier storage after the tiering cycle with a preferred path I/O access policy, in accordance with some embodiments of the present disclosure.

Referring now to FIG. 2B, which is a block diagram of MTSS pools 202-1, 202-2 of a multi-tier storage after the tiering cycle, in accordance with some embodiments of the present disclosure. According to embodiments of the present disclosure, in MTSS pool 202-1, the MTSS manager 106 can promote EXTENT 3 and EXTENT 4 to slots 208-1C, 208-1D, respectively. Thus, the slots 210-1A, 210-1B can be empty. The EXTENTS 5 and 6 are not promoted in the MTSS pool 202-1 because the MTSS manager promotes their mirrored copies to the available RI tier storage 212 in the MTSS pool 202-2.

Accordingly, in MTSS pool 202-2, the RI tier storage slots 214A, 214B contain EXTENTS 5 and 6, respectively. In order to take advantage of the RI tier storage 212, the MTSS manager 106 can additionally update the preferred path I/O access policy to direct future I/O operations of EXTENTS 5 and 6 to the copies stored in the MTSS pool 202-1, specifically in the RI tier storage 212. Additionally, the MTSS manager 106 can update the heat map 118 to indicate the copies of EXTENTS 5 and 6 stored in the MTSS pool 202-1 are cold. For example, the MTSS manager 106 can set their READ and WRITE heat values to zero.

Further, the upper storage slots 208-2A, 208-2B contain EXTENTS 1 and 2, respectively. As stated previously, EXTENT 2 qualifies for demotion during the tiering cycle. Accordingly, the MTSS manager 106 demotes EXTENT 2 from the RI tier storage 212 to the upper tier storage 204-2. If, in a future tiering cycle, the EXTENTS 5 and 6 are demoted from the RI tier storage 212, the MTSS manager 106 can update the preferred path I/O access policy to direct future I/O operations back to the copies in the MTSS pool 202-1.

Additionally, EXTENTS 3 and 4 in the MTSS pool 202-2 do not qualify for promotion or demotion during the tiering cycle. Accordingly, the lower tier storage slots 210-2A, 210-2B contain EXTENTS 3 and 4, respectively.

Figure 3A:
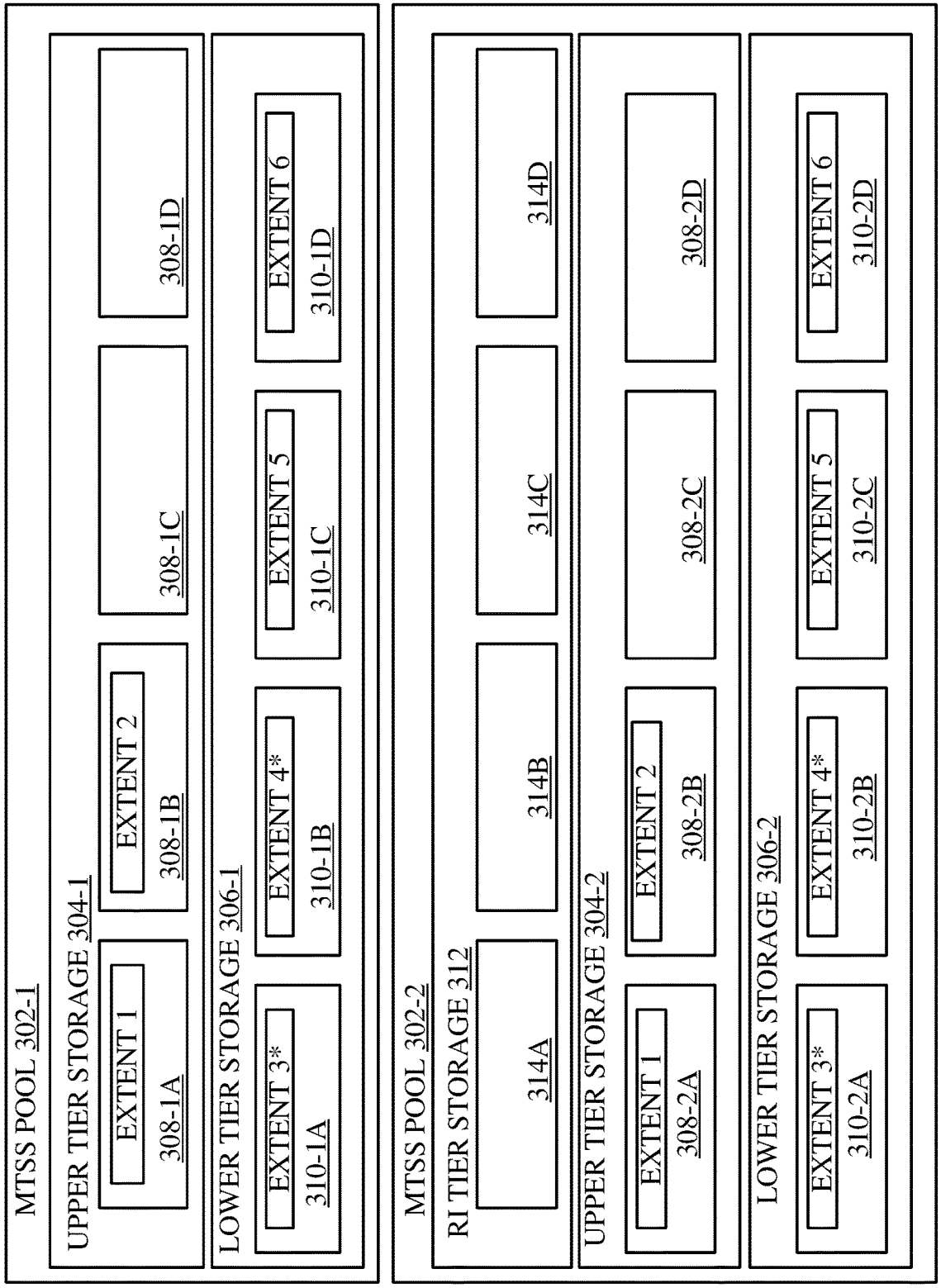
FIG. 3A is a block diagram of MTSS pools of a multi-tier storage before completion of a tiering cycle with a round robin I/O access policy, in accordance with some embodiments of the present disclosure.

Referring now to FIG. 3A, which is a block diagram of MTSS pools 302-1, 302-2 of a multi-tier storage before completion of a tiering cycle with a round robin I/O access policy, in accordance with some embodiments of the present disclosure. The MTSS pool 302-1 includes an upper tier storage 304-1 and a lower tier storage 306-1. The upper tier storage 304-1 can represent the tier with relatively faster access than the lower tier storage 306-1. The upper tier storage 304-1 includes four slots 308-1A through 308-1D to store promoted extents. For example, slots 308-1A, 308-1B store EXTENT 1 and EXTENT 2, respectively. Similarly, the lower tier storage 306-1 includes four slots 310-1A through 310-1D to store extents. In this example, slots 310-1A through 310-1D store EXTENT 3 through EXTENT 6, respectively. As shown, EXTENTS 3 and 4 are annotated with an asterisk, "*," indicating that these extents have met the heat map threshold for promotion from the lower tier storage 306-1.

The EXTENTS 1 through 6 represent extents from mirrored volumes. Accordingly, copies of the EXTENTS 1 through 6 can be stored in the MTSS pool 302-2. Similar to the MTSS pool 302-1, the MTSS pool 302-2 includes an upper tier storage 304-2 and a lower tier storage 306-2. Additionally, the MTSS pool 302-2 includes a read-intensive (RI) tier storage 312. The RI tier storage 312 includes four slots 314A through 314D to store promoted extents. In this example, the RI tier storage 312 is unused.

The upper tier storage 304-2 includes four slots 308-2A through 308-2D to store promoted extents. For example, slots 308-2A, 308-2B store EXTENTS 1 and 2, respectively. Similarly, the lower tier storage 306-2 includes four slots 310-2A through 310-2D to store extents. For example, slots 310-2A through 310-2D store EXTENT 3 through EXTENT 6, respectively. As shown, EXTENTS 3 and 4 are annotated with an asterisk, "*," indicating that these extents have met the heat map threshold for promotion from the lower tier storage 306-2.

According to embodiments of the present disclosure, the MTSS manager 106 can determine during the tiering cycle that the I/O access policy is round robin. Accordingly, the MTSS manager 106 can sum the heat values in the heat maps 118 for both copies of the mirrored data extents. In some embodiments, the MTSS manager 106 can sum the heat values when both copies meet promotion thresholds, such as EXTENTS 3 and 4 of this example. Further, if the summed heat values meat the promotion threshold to the RI tier storage 312, the MTSS manager 106 can promote the EXTENTS 3 and 4 in the MTSS pool 302-2.

Figure 3B:
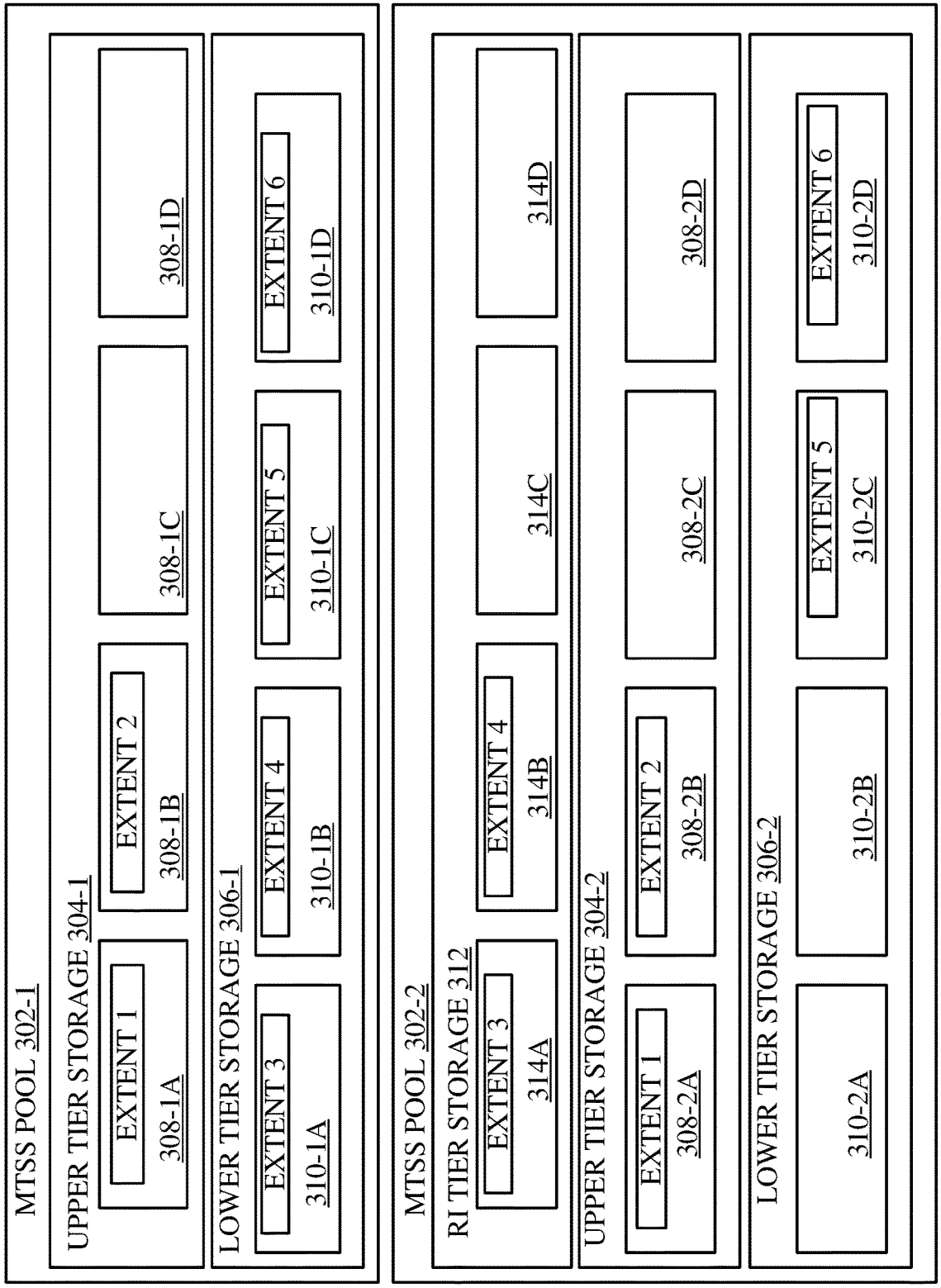
FIG. 3B is a block diagram of MTSS pools of a multi-tier storage after the tiering cycle with a round robin I/O access policy, in accordance with some embodiments of the present disclosure.

Referring now to FIG. 3B, which is a block diagram of MTSS pools 302-1, 302-2 of a multi-tier storage after the tiering cycle, in accordance with some embodiments of the present disclosure. Because the MTSS manager 106 selects the copies of EXTENTS 3 and 4 in the MTSS pool 302-2 for promotion, there are no changes in the MTSS pool 302-1 in this example.

Accordingly, in MTSS pool 302-2, the RI tier storage slots 314A, 314B contain EXTENTS 3 and 4, respectively. In order to take advantage of the RI tier storage 312, the MTSS manager 106 can additionally change the I/O access policy from a round robin policy to a preferred path policy. Further, the preferred path policy can direct future I/O operations of EXTENTS 3 and 4 to the copies stored in the MTSS pool 302-1, specifically in the RI tier storage 312. If, in a future tiering cycle, the EXTENTS 3 or 4 are demoted from the RI tier storage 312, the MTSS manager 106 can change the I/O access policy for the demoted data extent(s) back to round robin.

Additionally, the MTSS manager 106 can update the heat map 118 to indicate the copies of EXTENTS 3 and 4 stored in the MTSS pool 302-1 are cold. For example, the MTSS manager 106 can set their READ and WRITE heat values to zero.

Additionally, EXTENTS 1, 2, 5 and 6 in the MTSS pool 302-2 do not qualify for promotion or demotion during the tiering cycle. Accordingly, the upper tier storage slots 308-2A, 308-2B contain EXTENTS 1 and 2, respectively. Further, the lower tier storage slots 310-2C, 310-2D contain EXTENTS 5 and 6, respectively.

Figure 4:
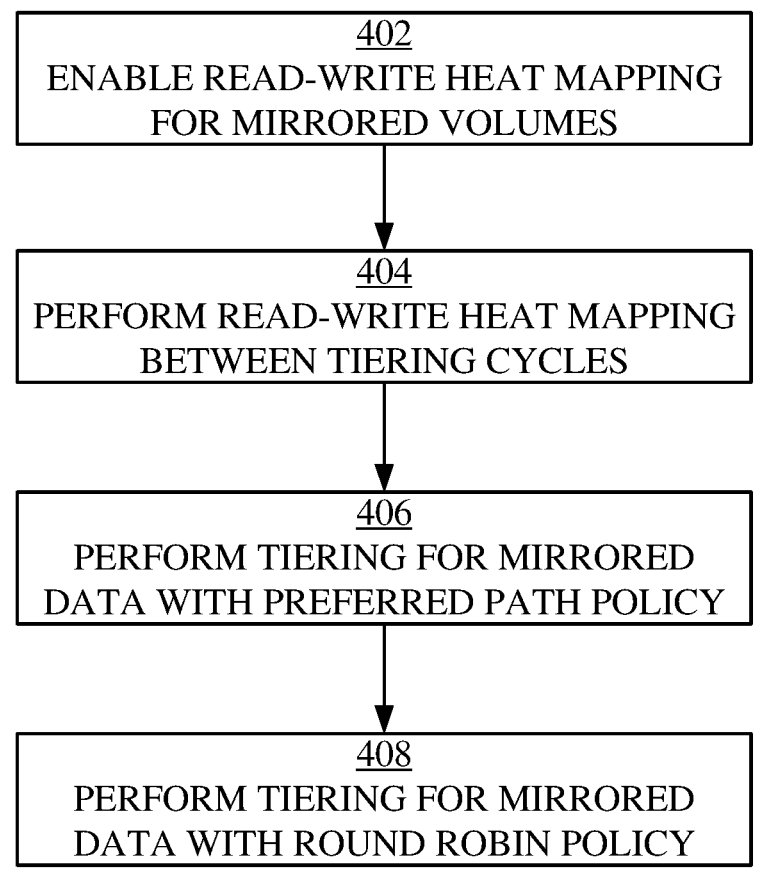
FIG. 4 is a flowchart of an example method for tiering in a multi-tier storage system having mirrored volumes, in accordance with some embodiments of the present disclosure.

FIG. 4 is a flowchart of an example method 400 for tiering in a multi-tier storage system having mirrored volumes, in accordance with some embodiments of the present disclosure. The MTSS manager 106 can perform the method 400 in accordance with some embodiments of the present disclosure.

At block 402, the MTSS manager 106 can enable read-write heat mapping for mirrored volumes 122. Enabling the read-write heat mapping can include identifying mirrored volumes in the multi-tiered storage 104.

At block 404, the MTSS manager 106 can perform read-write heat mapping between tiering cycles. The time between tiering cycles is when the data in the multi-tiered storage 104 is being accessed. Accordingly, during this time, the MTSS manager 106 can calculate separate heat values for the READ and WRITE operations performed on the data extents of the identified mirrored volumes 122. The MTSS manager 106 can thus use these separated heat values during the tiering cycle to make tiering decisions for mirrored data extents.

At block 406, the MTSS manager 106 can perform tiering for mirrored data with preferred path I/O access policy. The preferred path I/O access policy can result in one mirrored data extent having higher heat values than the other mirrored data extent. However, the hot mirrored data extent may belong to a storage pool 110 where the fastest storage tier 112 is slower than the fastest storage tier in the storage pool 110 storing the other mirrored data extent. As such, according to embodiments of the present disclosure, the MTSS manager 106 can promote the mirrored data extent with the lower heat value to take advantage of the faster storage tier 112. In this way, the MTSS manager 106 can improve the efficiency of future I/O operations performed for the data stored in both mirrored data extents.

At block 408, the MTSS manager 106 can perform tiering for mirrored data with round robin I/O access policy. The round robin I/O access policy can result in both mirrored data extents having heat values that do not meet the threshold for promotion. This can happen even though, when summed together, the heat values for both mirrored data extents can meet the promotion threshold. As such, according to embodiments of the present disclosure, the MTSS manager 106 can sum the heat values for mirrored data extents. In this way, the MTSS manager 106 can determine whether to promote one of the mirrored data extents based on whether the summed heat values meet the promotion threshold. Additionally, the MTSS manager 106 can direct future I/O operations performed for the data stored in the mirrored data extents to the copy that is promoted. Thus, future I/O operations can provide the advantage of the faster storage tier 112.

Figure 5:
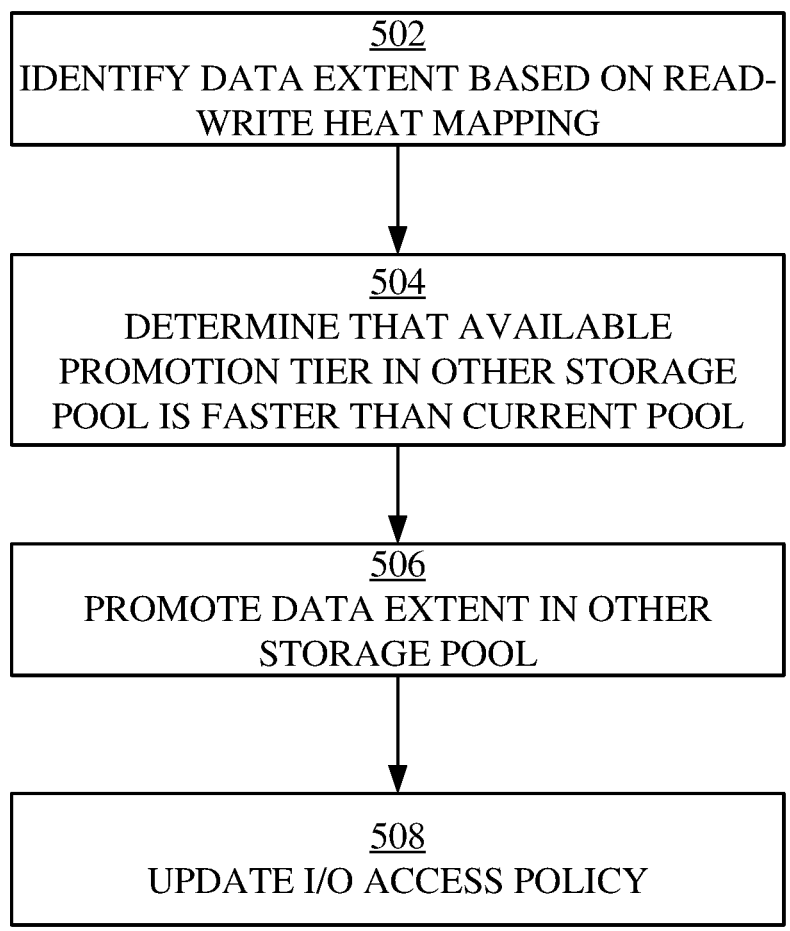
FIG. 5 is a flowchart of an example method for tiering mirrored data with a preferred path I/O access policy, in accordance with some embodiments of the present disclosure.

FIG. 5 is a flowchart of an example method 500 for tiering mirrored data with a preferred path I/O access policy, in accordance with some embodiments of the present disclosure. The MTSS manager 106 can perform the method 500 in accordance with some embodiments of the present disclosure. At block 502, the MTSS manager 106 can identify a data extent based on the read-write heat mapping. For example, read-intensive data extents can be associated with mirrored data extents that meet a predetermined threshold for the number of READ operations. Alternatively, or additionally, the read-intensive data can include mirrored data extents that meet a predetermined threshold for the percentage of READ operations of the total of READ and WRITE operations. According to embodiments of the present disclosure, the read-intensive data can be eligible for promotion to a faster storage tier 112, such as a read-intensive storage tier.

At block 504, the MTSS manager 106 can determine that the available promotion tier in one of the storage pools is faster than the available promotion tier in the other. Accordingly, the MTSS manager 106 can select a storage pool 110 for promotion based on the available storage tiers 112. According to embodiments of the present disclosure, the MTSS manager 106 can map the read-intensive data extents to the storage pools 110 storing each of the mirrored copies. Further, for each read-intensive data extent, the MTSS manager 106 can determine whether any of the mapped storage pools 110 include a read-intensive storage tier. If so, the MTSS manager 106 can select the mapped storage pool having the read-intensive storage. If the mapped storage pools 110 do not include a read-intensive storage tier, the MTSS manager 106 can determine which of the mapped storage pools 110 has the faster performing storage tier. Accordingly, the MTSS manager 106 can select the mapped storage pool having the faster storage tier.

At block 506, the MTSS manager 106 can promote the data extent in the storage pool 110 with the faster available promotion tier. For example, the MTSS manager 106 can move the mirrored data extent of a read-intensive data extent in the selected storage pool 110. More specifically, the MTSS manager 106 can move the mirrored data extent to the faster storage tier in the selected storage pool 110, such as a read-intensive storage tier.

At block 508, the MTSS manager 106 can update the I/O access policy for the promoted mirrored data extent. Performing future I/O operations on the promoted data extent can ensure a performance gain from the promotion. Accordingly, the MTSS manager 106 can update the I/O access policy to name the promoted data extent. Thus, future I/O operations are directed to the promoted copy. Additionally, in some embodiments, the MTSS manager 106 can update the heat map 118 to indicate the non-promoted copy is cold. Being cold can indicate a low heat value. Accordingly, the MTSS manager 106 can set the heat value for the non-promoted copy to zero.

Figure 6:
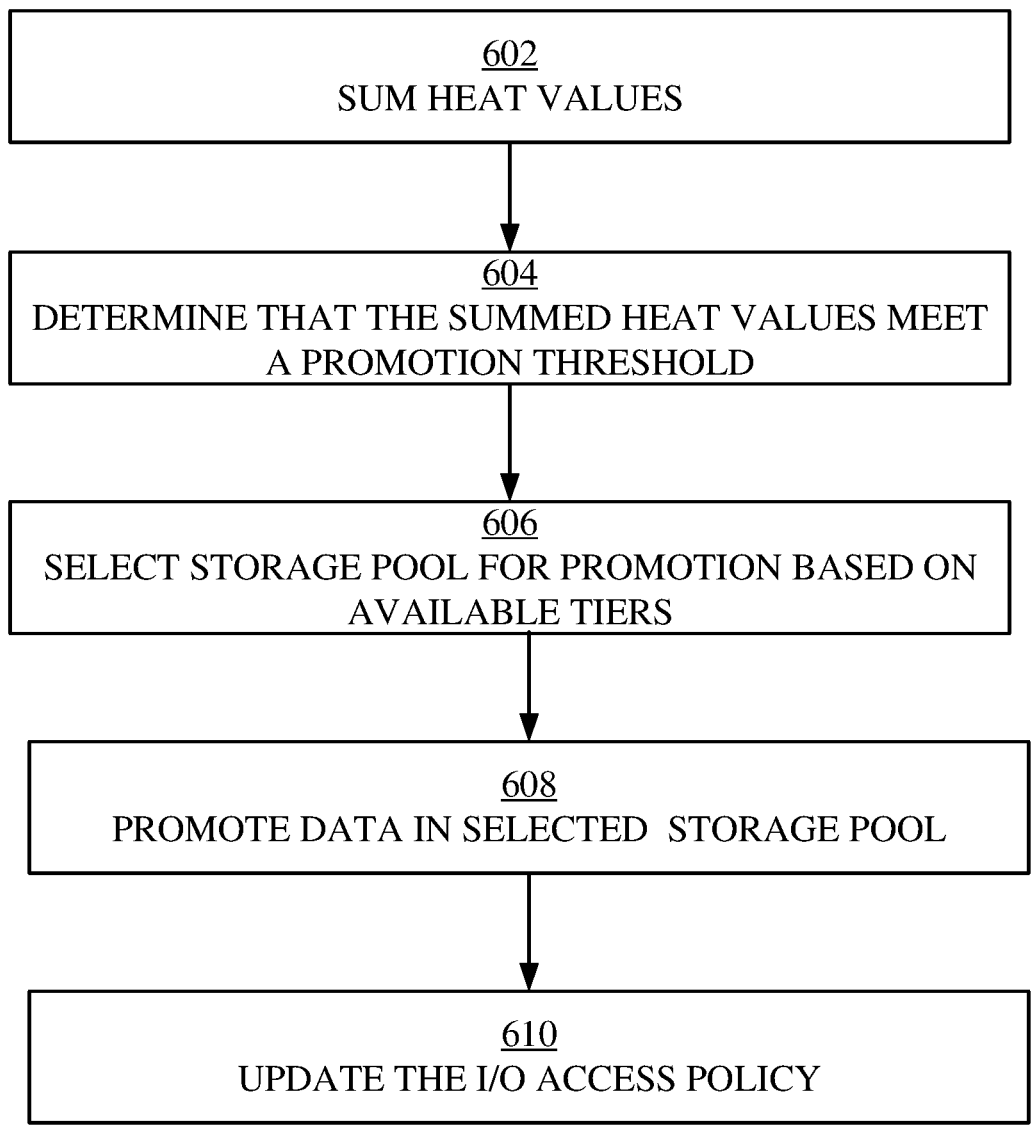
FIG. 6 is a flowchart of an example method for tiering mirrored data with a round robin I/O access policy, in accordance with some embodiments of the present disclosure.

FIG. 6 is a flowchart of an example method 600 for tiering mirrored data with a round robin I/O access policy, in accordance with some embodiments of the present disclosure. The MTSS manager 106 can perform the method 600 in accordance with some embodiments of the present disclosure. At block 602, the MTSS manager 106 can sum the heat values of both copies of mirrored data extents. In this way, the total heat value of this data can be used when making tiering decisions.

At block 604, the MTSS manager 106 can determine that the summed heat values meet a promotion threshold. The MTSS manager 106 can compare the summed heat value to the promotion thresholds for each of the storage pools 110 storing the mirrored data extents. If the summed heat values meet the promotion thresholds for any of the storage pools, the MTSS manager 106 can promote one of the copies of the mirrored data extents.

At block 606, the MTSS manager 106 can select a storage pool 110 for promotion based on the available storage tiers 112. According to embodiments of the present disclosure, the MTSS manager 106 can map the mirrored data extents to the storage pools 110 storing each of the mirrored copies. Further, for each data extent, the MTSS manager 106 can determine whether any of the mapped storage pools 110 include a read-intensive storage tier. If so, the MTSS manager 106 can select the mapped storage pool having the read-intensive storage. If the mapped storage pools 110 do not include a read-intensive storage tier, the MTSS manager 106 can determine which of the mapped storage pools 110 has the faster performing storage tier. Accordingly, the MTSS manager 106 can select the mapped storage pool having the faster storage tier.

At block 608, the MTSS manager 106 can promote the data extent in the selected storage pool 110. More specifically, the MTSS manager 106 can move the mirrored data extent to the faster storage tier in the selected storage pool 110, such as a read-intensive storage tier.

At block 610, the MTSS manager 106 can update the I/O access policy for the promoted mirrored data extent. Performing future I/O operations on the promoted data extent can ensure a performance gain from the promotion. Accordingly, the MTSS manager 106 can update the I/O access policy to preferred path. Additionally, the MTSS manager 106 can name the promoted data extent. Thus, future I/O operations are directed to the promoted copy. Additionally, in some embodiments, the MTSS manager 106 can update the heat map 118 to indicate the non-promoted copy is cold.

Embodiments of the present disclosure can provide advantages, such as tiering awareness for asymmetric storage pools. Tiering awareness for asymmetric storage pools can indicate that the storage pools 110 of mirrored data extents are not symmetric. For example, one storage pool 110 can include a read-intensive storage tier, while the storage pool 110 storing the mirrored copy does not. This tiering awareness can ensure that the correct read-intensive mirrored data extents can be promoted to the pool containing read-intensive storage. This tiering awareness can be useful in the cloud environment, where services, such as virtual machines can include asymmetrically tiered storage pools. Additional advantages can include the efficient use of faster storage tiers by promoting mirrored data where a faster performing tier is available. Further advantages include performance improvement because the faster tier space is allocated with automated logic. Accordingly, the MTSS manager 106 can move more to faster storage tiers than with current systems. The advantageous use of read-intensive storage can also lower the cost of storage solutions. Additionally, performance improvements can be achieved where production and analytics are running on same system because read-intensive data extents can be stored in read-intensive storage, and mixed workloads can be stored in SSD tiers for the same or different copies.

Figure 7:
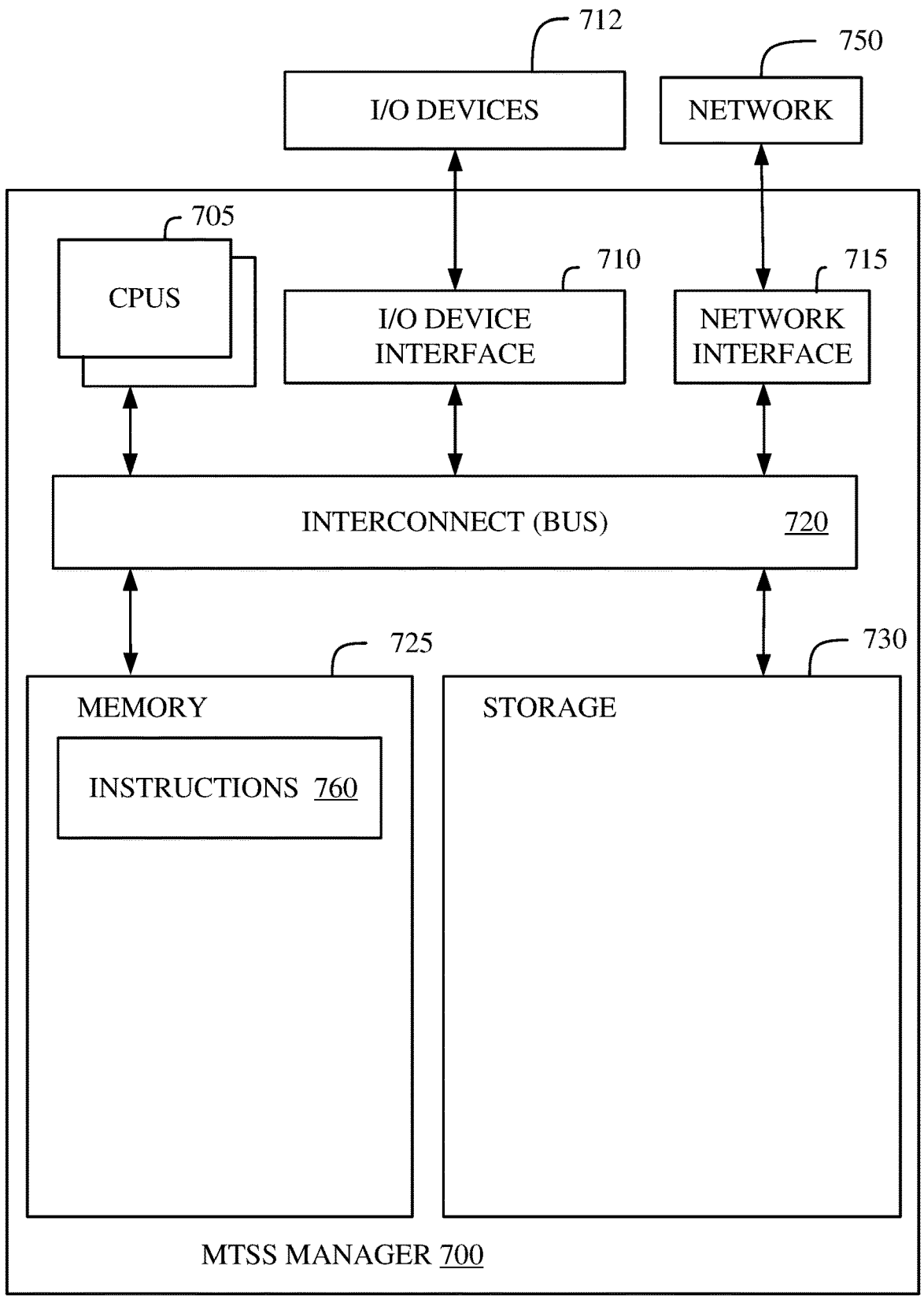
FIG. 7 is a block diagram of an example MTSS manager, in accordance with some embodiments of the present disclosure.

Referring now to FIG. 7, illustrated is a block diagram of an example MTSS manager 700, in accordance with some embodiments of the present disclosure. In various embodiments, the MTSS manager 700 is similar to the MTSS manager 106 and can perform the methods described in FIGS. 4-6 and/or the functionality discussed in FIGS. 1-3B. In some embodiments, the MTSS manager 700 provides instructions for the aforementioned methods and/or functionalities to a client machine such that the client machine executes the method, or a portion of the method, based on the instructions provided by the MTSS manager 700. In some embodiments, the MTSS manager 700 comprises software executing on hardware incorporated into a plurality of devices.

The MTSS manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the MTSS manager 700 via the I/O device interface 710 or a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the methods of FIGS. 4-6 and/or any of the functionality discussed in FIGS. 1-3.

In various embodiments, the I/O devices 712 include an interface capable of presenting information and receiving input. For example, I/O devices 712 can present information to a listener interacting with MTSS manager 700 and receive input from the listener.

The MTSS manager 700 is connected to the network 750 via the network interface 715. Network 750 can comprise a physical, wireless, cellular, or different network.

In some embodiments, the MTSS manager 700 can be a multi-user mainframe computer system, a single-user system, or a server computer or similar device that has little or no direct user interface but receives requests from other computer systems (clients). Further, in some embodiments, the MTSS manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary MTSS manager 700. In some embodiments, however, individual components can have greater or lesser complexity than as represented in FIG. 7, components other than or in addition to those shown in FIG. 7 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a first data extent for promotion, wherein the first data extent is stored in a first storage pool of a multi-tier storage system (MTSS), based on a read-write heat mapping by the MTSS, wherein:
   the first data extent is associated with a mirrored volume;
   the first data extent is a mirrored copy of a second data extent stored in a second storage pool of the MTSS; and the first storage pool is asymmetric to the second storage pool;
determining that a second top promotion tier of the second storage pool is faster than a first top promotion tier of the first storage pool;
promoting the second data extent to the second top promotion tier based on the determination; and
updating an I/O access policy to direct future I/O operations for the mirrored volume to the second data extent.

2. The method of claim 1, wherein the first data extent is read-intensive, wherein the first top promotion tier does not comprise a read-intensive storage, and wherein the second top promotion tier comprises the read-intensive storage.

3. The method of claim 2, wherein identifying the first data extent comprises determining that a number of READ operations performed on the read-intensive data extent exceeds a predetermined threshold.

4. The method of claim 3, wherein identifying the first data extent comprises determining that a percentage of READ operations performed on the read-intensive data extent exceeds a predetermined threshold, wherein the percentage of READ operations comprises a number of the READ operations performed on the first data extent divided by a total number of I/O access operations performed on the first data extent.

5. The method of claim 1, wherein the first storage pool comprises a first bottom storage tier.

6. The method of claim 5, wherein the first bottom storage tier is a cloud backup.

7. The method of claim 1, wherein the second top promotion tier provides faster I/O access than the first top promotion tier.

8. The method of claim 1, further comprising:
receiving a READ operation request for the mirrored volume; and
performing a READ operation of the second data extent in the second top promotion tier.

9. The method of claim 1, further comprising:
demoting the second data extent from the second top storage tier; and
updating the I/O access policy to direct future I/O operations for the mirrored volume to the first data extent.

10. A computer program product comprising program instructions stored on a computer readable storage medium, wherein the computer readable storage medium is not a transitory signal per se, the program instructions executable by a processor to cause the processor to perform a method comprising:
identifying a first data extent for promotion, wherein the first data extent is stored in a first storage pool of a multi-tier storage system (MTSS), based on a read-write heat mapping by the MTSS, wherein:
the first data extent is a mirrored copy of a second data extent stored in a second storage pool of the MTSS;
the first storage pool is asymmetric to the second storage pool;
the first data extent is read-intensive;
identifying the first data extent comprises determining that a number of READ operations performed on the read-intensive data extent exceeds a predetermined threshold the first data extent is associated with a mirrored volume;
determining that a second top promotion tier of the second storage pool is faster than a first top promotion tier of the first storage pool, wherein the second top promotion tier comprises read-intensive storage;
promoting the second data extent to the second top promotion tier based on the determination; and
updating an I/O access policy to direct future I/O operations for the mirrored volume to the second data extent.

11. The computer program product of claim 10, wherein identifying the first data extent comprises determining that a percentage of READ operations performed on the read-intensive data extent exceeds a predetermined threshold, wherein the percentage of READ operations comprises a number of the READ operations performed on the first data extent divided by a total number of I/O access operations performed on the first data extent, and wherein the first top promotion tier does not comprise the read-intensive storage.

12. The computer program product of claim 10, wherein the first storage pool comprises a first bottom storage tier.

13. The computer program product of claim 12, wherein the first bottom storage tier is a cloud backup.

14. The computer program product of claim 10, wherein the second top promotion tier provides faster I/O access than the first top promotion tier.

15. The computer program product of claim 10, the method further comprising:
receiving a READ operation request for the mirrored volume; and
performing a READ operation of the second data extent in the second top promotion tier.

16. The computer program product of claim 10, the method further comprising:
demoting the second data extent from the second top storage tier; and
updating the I/O access policy to direct future I/O operations for the mirrored volume to the first data extent.

17. A system comprising:
a computer processing circuit; and
a computer-readable storage medium storing instructions, which, when executed by the computer processing circuit, are configured to cause the computer processing circuit to perform a method comprising:
identifying a first data extent for promotion, wherein the first data extent is stored in a first storage pool of a multi-tier storage system (MTSS), based on a read-write heat mapping by the MTSS, wherein:
the first data extent is a mirrored copy of a second data extent stored in a second storage pool of the MTSS;
the first storage pool is asymmetric to the second storage pool;
the first data extent is read-intensive;
identifying the first data extent comprises:
determining that a number of READ operations performed on the read-intensive data extent exceeds a predetermined threshold the first data extent is associated with a mirrored volume; and
determining that a percentage of READ operations performed on the read-intensive data extent exceeds a predetermined threshold, wherein the percentage of READ operations comprises a number of the READ operations performed on the first data extent divided by a total number of I/O access operations performed on the first data extent;
determining that a second top promotion tier of the second storage pool is faster than a first top promotion tier of the first storage pool, wherein the second top promotion tier comprises read-intensive storage;
promoting the second data extent to the second top promotion tier based on the determination; and
updating an I/O access policy to direct future I/O operations for the mirrored volume to the second data extent.

18. The system of claim 17, wherein the second top promotion tier provides faster I/O access than the first top promotion tier, and wherein the first top promotion tier does not comprise the read-intensive storage.

19. The system of claim 17, the method further comprising:
- receiving a READ operation request for the mirrored volume; and
- performing a READ operation of the second data extent in the second top promotion tier.

20. The system of claim 17, the method further comprising:
- demoting the second data extent from the second top storage tier; and
- updating the I/O access policy to direct future I/O operations for the mirrored volume to the first data extent.

* * * * *